Sept. 1, 1936.  F. T. BREWSTER  2,052,749
HOG DROP
Filed Nov. 13, 1934  4 Sheets-Sheet 1

Witness -
Wm C. Meiser

INVENTOR
FREDERICK T. BREWSTER
BY
ATTORNEY

Sept. 1, 1936.　　　　F. T. BREWSTER　　　　2,052,749
HOG DROP
Filed Nov. 13, 1934　　　　4 Sheets-Sheet 2

INVENTOR
FREDERICK T. BREWSTER
BY
ATTORNEY

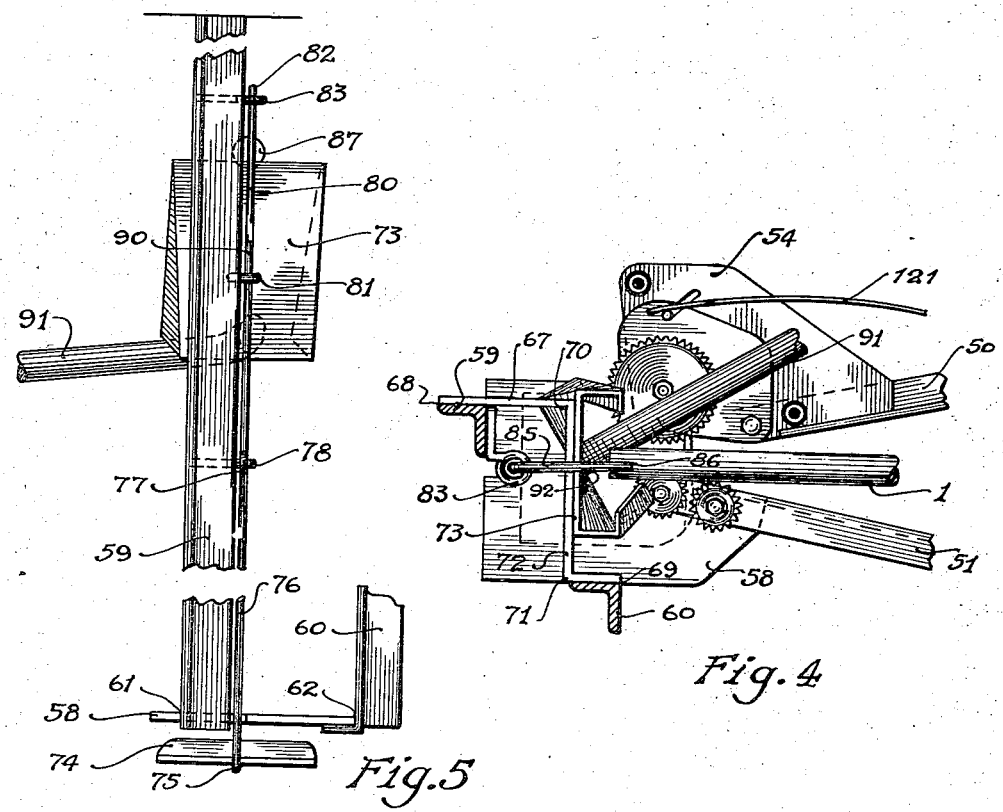

Sept. 1, 1936. F. T. BREWSTER 2,052,749
HOG DROP
Filed Nov. 13, 1934 4 Sheets-Sheet 4
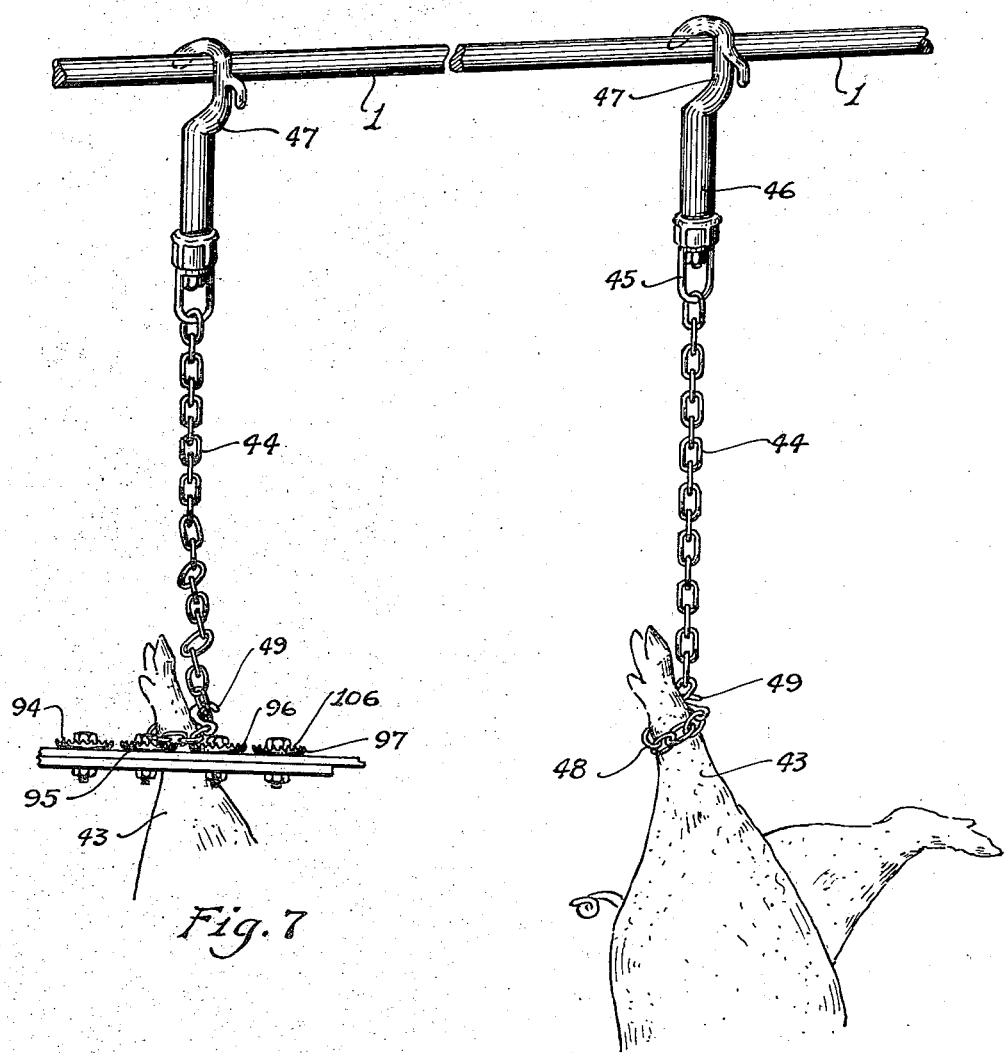
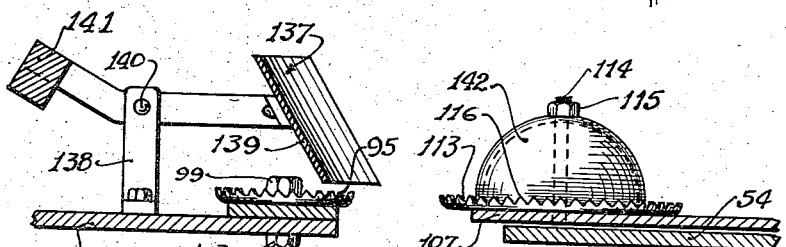
INVENTOR
FREDERICK T. BREWSTER
BY
ATTORNEY Patented Sept. 1, 1936

2,052,749

UNITED STATES PATENT OFFICE 2,052,749

HOG DROP

Frederick T. Brewster, Watertown, S. Dak., assignor to Industrial Patents Corporation, Chicago, Ill., a corporation of Delaware Application November 13, 1934, Serial No. 752,844

23 Claims. (Cl. 17—24)

This invention relates to a device for automatically releasing a shackled object from a chain shackle.

One of the objects of the invention is to provide means for releasing a shackled object from a chain shackle.

Another object of the invention is to provide automatic means for unshackling animals or animal carcasses.

Another object of the invention is to provide automatic means at the end of the bleeding rail to unshackle hog carcasses and to permit the hog carcass to drop free of the shackle.

Another object of the invention is to provide automatic means for transferring hog carcasses from the bleeding rail to the scalding tub.

Another object of the invention is to provide means for transferring shackles, from which the hog carcass has been removed, from the bleeding rail to a shackle rail for return to the shackler.

Another object of the invention is to provide means for positively controlling the passage of a hog carcass suspended by a shackle from the bleeding rail, in operative relationship with means for removing the hog carcass from the shackle.

Another object of the invention is to provide an automatic hog drop to cause a hog carcass suspended by a shackle from the bleeding rail, to drop free of its shackle into the scalding tub without the use of power other than that supplied by gravity.

Other objects of the invention will be apparent from the description and claims which follow.

In conventional abattoir practice, hogs are driven into a shackling pen where a length of chain attached to a hook by a swivel and having a hook at the free end, is fastened about one hind foot of the hog. The swivelled hook is placed on an elevating means which lifts the hog from the floor and passes the hook to an overhead rail which carries the hog past an operator who opens the jugular vein with a knife. The bleeding hog then passes to what is known as the bleeding rail, which is an overhead rail set at an inclination such that the hog moves the length of the rail by gravity and is usually a continuation of the sticking rail. The rail is of sufficient length to permit completion of bleeding by the time the hog reaches the end of the rail, after which the hog is removed and placed in a tub of warm water. At this juncture, the shackle is removed by hand, the hamstring is cut, a hook is inserted and suspended by conveying means which carries the hog carcass through the scalding tub and thence to the dehairing machine and the subsequent butchering operations. In many cases the hog is passed directly from the bleeding rail to the scalding tub and it is not unusual merely to permit the hog to float the length of the scalding tub without positive conveying means, other than manual pushing and pulling with poles or hooks, but it is generally admitted to be better practice to drop the hog carcass into an intermediate vessel containing warm water before transferring it to scalding water because of the possibility that the hog may be alive when it leaves the bleeding rail.

The present invention is concerned solely with the transfer of the hog carcass from the bleeding rail to the scalding tub. The term scalding tub as used in this specification and in the claims which follow, is used in the broad sense of including not only a vessel filled with scalding water designed to loosen the hair and bristles, but also an intermediate vessel of the type to which reference has hereinbefore been made, and also to any table, shelf, floor, rack, vessel or the like, which for convenience might be used as an accessory of, or ancillary to the scalding tub proper.

It will be understood of course, that in its broadest aspect, the present invention is an automatic drop for unshackling a shackled object, irrespective of the object shackled, the purpose for which the object is unshackled, or the place to which the object is dropped.

A preferred embodiment of the present invention is disclosed in the accompanying drawings, in which similar reference characters in the several figures designate similar parts.

Figure 3 is a plan view showing parts of the apparatus below section line 3—3 of Figure 2, the hog carcass and shackle omitted.

Figure 4 is a plan view showing parts of the apparatus below section line 4—4 of Figure 2.

Figure 5 is an end view of the device shown in Figure 2.

Figure 6 is a perspective view showing the manner in which a shackled hog passes down the bleeding rail.

Figure 7 is a perspective view, showing a shackled hog foot in the position it assumes relative to the shackle immediately preceding the freeing of the shackle.

Figure 8 is a detailed view of the guard for the small picker disks shown in perspective in Figure 1, but, for clearness, omitted from the remaining figures.

Figure 9 is a detailed side view, partly in section, showing the guard for the large picker disk.

Figure 1:
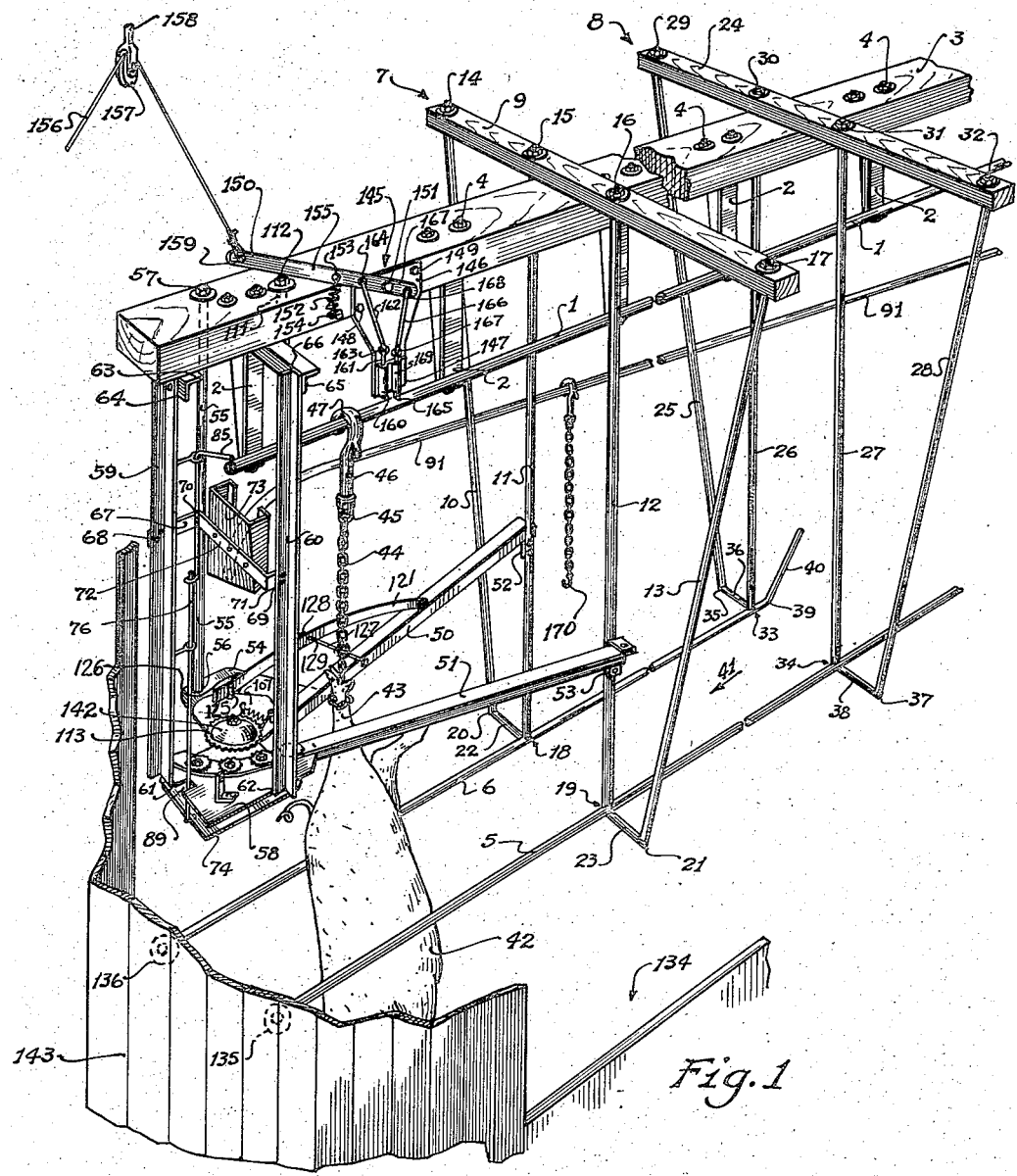
Figure 1 is a perspective view of one embodiment of the present invention.

Referring now more particularly to Figure 1:

Bleeding rail 1 is rigidly affixed to a plurality of supports 2 secured to beam 3 as by bolts 4. The beam 3 is fixed in an elevated position by suitable means not shown. Guard rails 5 and 6 are braced at spaced points by braces 7 and 8 respectively.

Brace 7 consists of the beam 9 resting on beam 3 and rods 10, 11, 12 and 13, which are respectively secured to beam 9, as by nuts 14, 15, 16 and 17. Rods 10 and 11 are rigidly affixed to guard rail 6 as by welding or otherwise at 18. Rods 12 and 13 are rigidly affixed to guard rail 5 as by welding or otherwise at 19. It will be seen that rod 10 is bent at 20 and that rod 13 is bent at 21, forming horizontal portions 22 and 23 respectively to take the thrust against guard rails 6 and 5 respectively from a swinging hog carcass passing between the guard rails 5 and 6 and bumping against these guard rails in consequence of the swinging movement or sideway which naturally accompanies the forward progress of the hog carcass, it being the purpose of guard rails 5 and 6 to reduce the tendency of the hog carcass to move other than in an onward direction. It will be readily appreciated when the device of the present invention is clearly understood, that guard rails 5 and 6 function also as guides, to steady the moving hog carcass and guide it to the unshackling mechanism.

Brace 8 consists of beam 24, which like beam 9, rests on beam 3, and of rods 25, 26, 27 and 28, respectively secured to beam 24 by nuts 29, 30, 31 and 32. Rods 25 and 26 are rigidly affixed to guard rail 6 as by welding or otherwise at 33. The rods 27 and 28 are rigidly affixed to guard rail 5 as by welding or otherwise at 34. The rod 25 is bent at 35 forming straight portion 36. Rod 28 is bent at 37, forming straight portion 38. Straight portions 36 and 38 take the thrust of hog carcasses bumping against rails 6 and 5 respectively in a manner similar to straight portions 22 and 23 of rods 10 and 13 respectively.

Rail 6 is bent at 39 and the end 40 of rail 6 flares away from the path 41 defined by the parallel portions of rails 5 and 6, thus positively guiding hog carcasses into path 41, through which the carcasses move in the direction of the arrow adjacent the reference character 41, in Figure 1.

Hog carcass 42, suspended from leg 43 by chain 44 affixed by swivel 45 to shank 46 of hook 47 on bleeding rail 1, comes from the sticking station, not shown, hook 47 sliding along inclined bleeding rail 1 by the force of gravity.

The manner in which hog carcass 42 is suspended is clearly shown, for example, in Figure 6, where it will be seen that chain 44 is looped about leg 43, forming bight 48 with hook 49 caught around the standing part of chain 44 adjacent leg 43.

After the hog 42 passes brace 7, its direction of movement is further limited and controlled by converging guide rails 50 and 51 rigidly affixed to rod 11 at 52 and rod 12 at 53 respectively and defining a progressively constricted passage converging in the direction of inclination of inclined rail 1.

Guide bar 50 is affixed to and provides support for plate 54 which also receives support from brace bar 55 rigidly affixed to plate 54 at 56, and to beam 3 by nut 57. Similarly, guide bar 51 is rigidly affixed to and provides support for plate 58. Plate 58 is also braced by angle irons 59 and 60 respectively affixed to plate 58 at 61 and 62.

Angle iron 59 is rigidly affixed to angle iron 63 at 64. Angle iron 60 is rigidly affixed to angle iron 65 at 66. Angle irons 63 and 65 are rigidly affixed to beam 3. Angle irons 59 and 60 are further mutually braced by strap 67 affixed to angle iron 59 at 68 and to angle iron 60 at 69. Strap 67 is bent at 70 and at 71, forming a straight portion 72 to which is rigidly affixed channel box 73.

Figure 2:
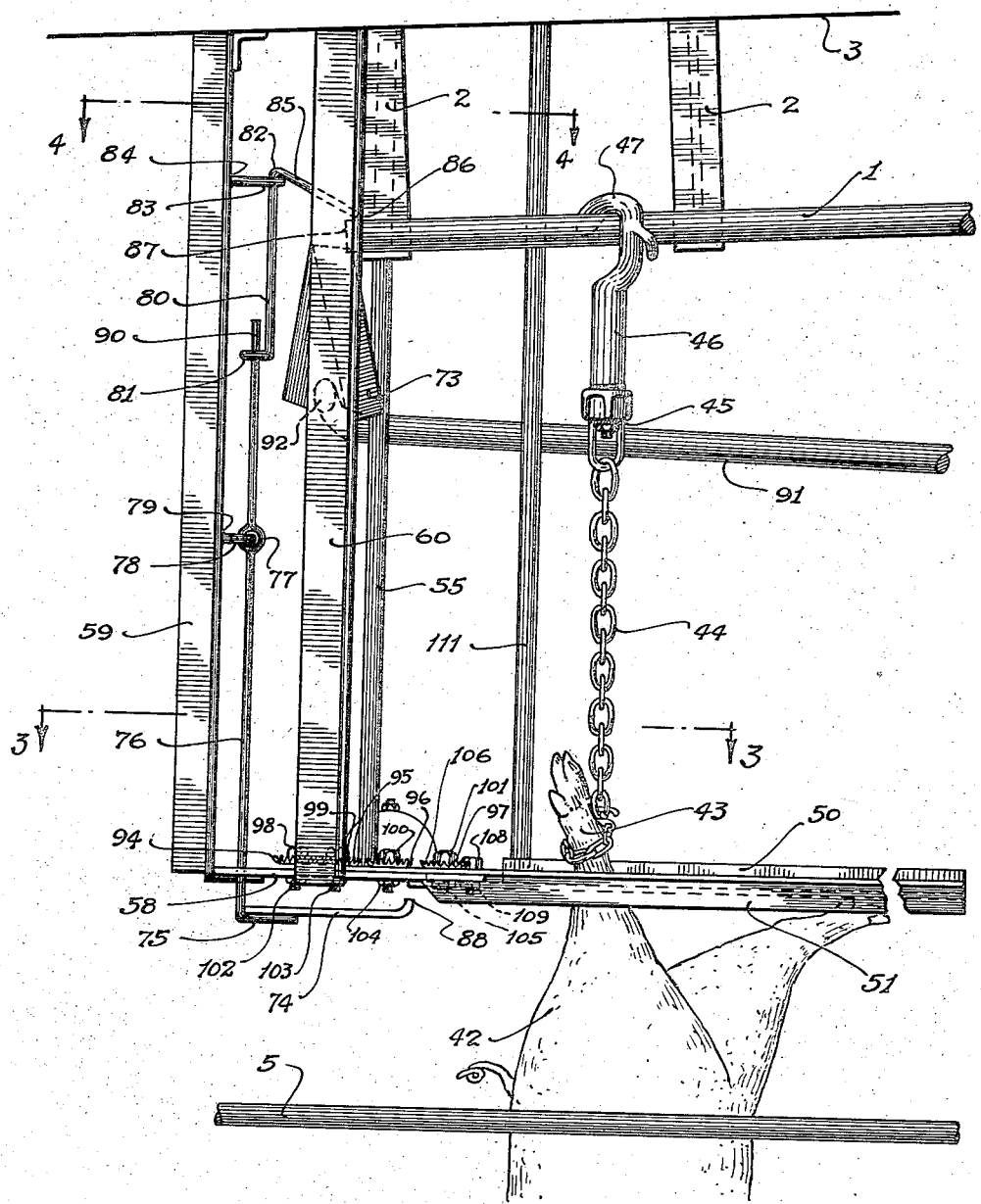
Figure 2 is a side view illustrating the approach of a hog carcass to the drop mechanism.

Trip plate 74 is rigidly affixed to the end 75 of rod 76 which may be clearly seen by reference to Figure 2. The rod 76 is provided with eye 77, pivoted in eye 78. Eye 78 is rigidly affixed as by welding to angle iron 59, at 79. Rod 80 is provided with eye 81 at its lower end, which is slipped down over the upper end of rod 76, forming a collar therefor. Rod 80 is supported at the bend 82 by eye 83, through which rod 80 passes. Eye 83 is rigidly affixed to angle 59 at 84. Portion 85 of rod 80 is bent downwardly to form a shackle stop, and in its normal operative position, contacts bleeding rail 1 at 86, thus preventing shackle hook 47 from passing off bleeding rail 1 at the end 87.

It will be seen that pressure directed against the edge 88 of plate 74, will cause rod 76 to pivot on its eye 77 in eye 78, the rod 76 being free to move in slot 89 of plate 58, thus forcing the upper end 90 of rod 76 against collar 81, causing rod 80 to pivot in eye 83 at the bend 82, raising up shackle stop 85 from its contact point 86 with bleeding rail 1, permitting shackle hook 47 to slide off the end 87 of bleeding rail 1 and fall to shackle return rail 91, which is rigidly affixed at its end 92 to channel box 73, which is shaped to form a guide for the positive deposition of the hook 47 on return shackle rail 91 to be carried back to the shackling pen.

It has been previously pointed out that guide bar 51 is affixed to and provides support for plate 58. It will be seen by reference to Figures 1, 2 and 3, that guide bar 51 has a curved, strap-like end 93, upon which are mounted small picker disks 94, 95, 96 and 97, which are mounted above strap 93 by bolts 98, 99, 100, 101, respectively. Bolts 98, 99, 100, and 101 pass through both strap 93 and plate 58, being held in position by nuts 102, 103, 104, and 105 respectively. Picker disks 94, 95, 96 and 97 are serrated at their peripheral edge to form a plurality of upwardly directed teeth 106, and are rotatively mounted with respect to bolts 98, 99, 100 and 101. Picker disk plate 107 is pivotally mounted on plate 54 by means of bolt 108, held by nut 109. It will be seen that bolt 108 passes through guide bar 50 as well as plate 54, and serves to tie plate 54 to guide bar 50, avoiding the possibility of a pivotal movement about the point 110, the point at which brace rod 111 passes through plate 54 and bar 50, serving to affix bar 50 to plate 54. Rod 111 as may be seen by reference to Figure 1 is rigidly secured to beam 3 by nut 112.

Large picker disk 113 is pivotally mounted on plate 107 by bolt 114 held in place by nut 115. Picker disk 113 is serrated at its peripheral edge to form upwardly extending teeth 116, in cooperative relation with which is dog 117 pivotally mounted on pin 118, secured to plate 107. Dog 117 is held in operative relationship with teeth 116 by spring 119 affixed to pin 120 on plate 107. A flat spring 121 is mounted on guide bar 50 at 122 by means of bolt 123. Spring 121 is in contact at its free end 124 with pin 125, rising above plate 107. Pin 125 passes through plate 107 and extends below the lower surface of plate 54, the pivotal movement of plate 107 on bolt 108 being limited by the travel of pin 125 in slot 126, provided in plate 54. The tension of spring 121 may be adjusted by taking up on bolt 127 with nut 128. It will be seen by reference to Figure 3 that bolt 127 passes through spring 121 at 129 and passes through flange 130 of guide bar 59 at 131. It will be seen that spring 121 forces plate 107 to the position shown in Figure 3, with the pin 125 against the end 132 of slot 126. It will be seen also that pressure applied between the small picker disks and the large picker disk 113, will force plate 107 in a direction away from the small picker disks until pin 125 has reached the end 133 of slot 126.

When a hog carcass approaches the end of its travel suspended on bleeding rail 1, leg 43 first comes opposite picker disk 97. The length of the chain 44 is such that the bight 48 is above picker disk 97. As leg 43 passes picker disk 97, the teeth 105 of picker disk 97 are in contact with the surface of leg 43 and the bight 48 of chain 44 is resting on the upper surface of picker disk 97.

As the hog carcass continues its progress, leg 43 next contacts the edge 88 of plate 74. As it continues its progress it forces plate 74 before it and comes opposite small picker disk 96, which like picker disk 97, rotates and offers substantially no resistance to the progress of the carcass.

At this juncture, due to the inclination of the bleeding rail 1, hook 47 is lower than it was when leg 43 was opposite picker disk 97, and the bight 48 is now receiving support from both picker disk 96 and large picker disk 113, causing slack in chain 44, as is clearly shown in Figure 7. At this point, the bight 48 is no longer drawn taut about leg 43, and due to the weight of the hog, leg 43 slips out of the shackle and hog 42 falls into the scalding tub 134. Guard rails 5 and 6 are rigidly affixed to splash board 143 as at 135 and 136.

At the instant of falling, hog 42 has reached the limit of its forward progress by reason of the impedance of plate 74, which has reached the limit of its movement and caused shackle stop 85 to rise at its end from its contact at 86 on bleeding rail 1, permitting hook 47 to slide off end 78 and drop through channel block guide 73 to return shackled rail 91, which has an inclination opposite to that of bleeding rail 1 and is set at an angle thereto, as may be clearly seen by reference to Figure 4. The bight 48 passes around in the direction of the arrows shown in Figure 3, being supported in its path by picker disks 95 and 113, and 94 and 113.

In order to prevent shackle chains from piling up on the picker disks, guards are provided.

The guard 137 is shown in detail in Figure 8. It consists of strap 138 mounted on plate 58 to form a support, to which arc-shaped shield 139 is hinged at 140, being balanced by weight 141 so that the edge of shield 139 is over the small picker disks 94, 95, 96 and 97, and assists in carrying the slack in the chain. Guard 142 performs a similar function for large picker disk 113.

Although for clearness and to avoid excessive detail, only one hog is shown in Figure 1, it will be understood that in large scale operations, the bleeding rail may be closely packed with hogs. To assure uniform operation of the device, it is desirable to permit but one hog to approach the picker disks at a time and to relieve the approaching hog of the pressure of a plurality of hogs behind. This may be done by any desired means.

An effective means is shown in Figure 1. Stop 145 is provided to control the feeding of hogs to the hog drop. Its operation will be readily understood by reference to Figure 1. Plate 146 is rigidly affixed to beam 3 and is positioned so that the edge 147 is over and slightly to one side of bleeding rail 1, being held in position as by screws 148 and 149.

Link 150 is pivoted on pin 151 affixed to plate 146. Spring 152 is attached to link 150 at 153 and to beam 3 at 154 and serves to pull arm 155 of link 150 downwardly. The opposite position may be controlled by an operator, not shown, by pulling on line 156. Line 156 passes over pulley 157 suspended from support 158 and is attached at 159 to link 150. Sleeve 160 is mounted on plate 146. Within sleeve 160 is slidably mounted pin 161, to which is attached link 162 at 163. Link 162 is affixed to arm 155 of link 150 at 164. Pin 165 is slidably mounted in sleeve 169 and is affixed to link 166 at 167. Link 166 is affixed to arm 167 of link 150 at 168. The mounting of link 162 and 166 at 164 and 168 is a pivotal mounting, as is the connection between pin 161 and link 162 at 163, and the mounting of pin 165 to link 166 at 167.

It will be seen by reference to Figure 1 that when the line 156 is drawn taut, pin 161 is drawn up in sleeve 160 and pin 165 passing down through sleeve 169 contacts bleeding rail 1. When line 156 is released, spring 152 pulling on arm 155 causes link 150 to pivot at 151 forcing pin 161 downwardly and sleeve 160 into contact with bleeding rail 1, and draws pin 165 upwardly in sleeve 169 out of contact with bleeding rail 1. It will be seen, therefore, that by manipulation of line 156, a single shackle hook may be permitted to pass under stop 145, alternate shackle hooks being stopped by pins 160 and 165.

The present invention affords a convenient, inexpensive, automatic device whereby hogs passing down the bleeding rail may be unshackled, deposited in the scalding tub and the shackles returned to the shackler, as shackle 170 is being returned in Figure 1.

The operation is simple and involves merely supporting the bight of the shackle chain about the hog's leg while the shackle hook slides downwardly along the bleeding rail permitting the slack in the shackle chain, thus causing the hog to be released from the shackle, which may then be returned to the shackler on another inclined rail, which receives the shackle hook when it falls from the bleeding rail.

It will be understood that the present invention is not limited to the details of the preferred embodiment which have heretofore been described and that changes in the details may be made without departing from the spirit of this invention as defined in the claims which follow.

I claim:

1. A device of the class described comprising rotatable picker disks, an inclined rail for the gravity conveyance of shackled hogs to the picker disks, and guides for said hogs, said picker disks being adapted to release shackles from hogs passing therethrough.

2. A device of the class described comprising cooperatively disposed picker disks, an inclined rail for the gravity conveyance of shackled hogs to the picker disks, and guides for said hogs, said picker disks being adapted to release shackles from hogs passing therethrough.

3. A device of the class described comprising rotatable picker disks, an inclined rail for the gravity conveyance of shackled hogs to the picker disks, guides for said hogs, and a shackle stop operative by contact of the hog passing between said picker disks, said picker disks being adapted to release shackles from hogs passing therethrough.

4. A device of the class described comprising rotatable picker disks, an inclined rail for the gravity conveyance of shackled hogs to the picker disks, guides for said hogs, a shackle stop operative by contact of the hog passing between said picker disks and a shackle return rail adapted to receive shackles from the first mentioned rail, said picker disks being adapted to release shackles from hogs passing therethrough.

5. A device of the class described comprising rotatable picker disks, an inclined rail for the gravity conveyance of shackled hogs to the picker disks, guides for said hogs, a shackle stop operative by contact of the hog passing between said picker disks, a shackle return rail adapted to receive shackles from the first mentioned rail, and guide means to control the transfer of said shackles from said first mentioned rail to said shackle return rail, said picker disks being adapted to release shackles from hogs passing therethrough.

6. A device of the class described comprising rotatable picker disks, an inclined rail for the gravity conveyance of shackled hogs to the picker disks, guides for said hogs, a shackle stop operative by contact of the hog passing between said picker disks, a shackle return rail adapted to receive shackles from the first mentioned rail, and guide means to control the transfer of said shackles from said first mentioned rail to said shackle return rail, said picker disks being serrated at their peripheral edges and adapted to release shackles from hogs passing therethrough.

7. A device of the class described comprising rotatable picker disks, an inclined rail for the gravity conveyance of shackled hogs to the picker disks, guides for said hogs, a shackle stop operative by contact of the hog passing between said picker disks, a shackle return rail adapted to receive shackles from the first mentioned rail, and guide means to control the transfer of said shackles from said first mentioned rail to said shackle return rail, said picker disks being serrated at their peripheral edges, arranged to flank a constricted passage into which a shackled hog leg may be led, and adapted to release shackles from hogs passing therethrough.

8. A device of the class described comprising rotatable picker disks, an inclined rail for the gravity conveyance of shackled hogs to the picker disks, guides for said hogs, a shackle stop operative by contact of the hog passing between said picker disks, a shackle return rail adapted to receive shackles from the first mentioned rail, and guide means to control the transfer of said shackles from said first mentioned rail to said shackle return rail, said picker disks being serrated at their peripheral edges, arranged to flank a constricted passage into which a shackled hog leg may be led, and adapted to release shackles from hogs passing therethrough, the picker disks on opposite sides of said constricted passage being movable relative to each other.

9. A device of the class described comprising an inclined rail for the gravity conveyance of shackled hogs, guides for said hogs, cooperatively disposed, rotatable picker disks adapted to release shackles from hogs passing therethrough, a shackle stop operative by contact of the hog passing between said picker disks, a shackle return rail adapted to receive shackles from the first mentioned rail, and guide means to control the transfer of said shackles from said first mentioned rail to said shackle return rail, said picker disks being serrated at their peripheral edges and arranged to flank a constricted passage into which a shackled hog leg may be led, picker disks on opposite sides of said constricted passage being movable relative to each other, the inclination of said first mentioned rail being such, relative to said picker disks, as to permit slackening the shackle chain during the passage of a hog between said picker disks.

10. A device of the class described comprising an inclined rail for the gravity conveyance of shackled hogs, guides for said hogs, cooperatively disposed, rotatable picker disks adapted to release shackles from hogs passing therethrough, a shackle stop operative by contact of the hog passing between said picker disks, a shackle return rail adapted to receive shackles from the first mentioned rail, and guide means to control the transfer of said shackles from said first mentioned rail to said shackle return rail, said picker disks being serrated at their peripheral edges and arranged to flank a constricted passage into which a shackled hog leg may be led, picker disks on opposite sides of said constricted passage being movable relative to each other, the inclination of said first mentioned rail being such, relative to said picker disks, as to permit slackening the shackle chain during the passage of a hog between said picker disks, and means for controlling the feed of hogs to said picker disks.

11. A device of the class described comprising an inclined rail for the gravity conveyance of shackled hogs, guides for said hogs, cooperatively disposed, rotatable picker disks adapted to release shackles from hogs passing therethrough, a shackle stop operative by contact of the hog passing between said picker disks, a shackle return rail adapted to receive shackles from the first mentioned rail, and guide means to control the transfer of said shackles from said first mentioned rail to said shackle return rail, said picker disks being serrated at their peripheral edges and arranged to flank a constricted passage into which a shackled hog leg may be lead, picker disks on opposite sides of said constricted passage being movable relative to each other, the inclination of said first mentioned rail being such, relative to said picker disks, as to permit slackening the shackle chain during the passage of a hog between said picker disks, and means for controlling the feed of hogs to said picker disks, said feed control means comprising pins alternately contactable with said first mentioned rail.

12. In a device of the class described, a plurality of relatively small fixed picker disks, arranged in series in an arc, and a relatively large picker disk spaced from said small picker disks and positioned within said arc.

13. In a device of the class described, a plurality of relatively small fixed picker disks, arranged in series in an arc, and a relatively large picker disc spaced from said small picker disks and positioned within said arc, said large picker disk being mounted to permit movement a greater distance from said small picker disks.

14. In a device of the class described, a plurality of relatively small fixed picker disks, arranged in series in an arc, and a relatively large picker disc spaced from said small picker disks and positioned within said arc, said large picker disk being mounted to permit movement a greater distance from said small picker disks, all of said picker disks having serrated peripheral edges.

15. In a device of the class described, a plurality of relatively small fixed picker disks, arranged in series in an arc, and a relatively large picker disk spaced from said small picker disks and positioned within said arc, said large picker disk being mounted to permit movement a greater distance from said small picker disks, all of said picker disks having serrated peripheral edges forming upwardly directed teeth.

16. In a device of the class described, a plurality of relatively small fixed picker disks, arranged in series in an arc, and a relatively large picker disk spaced from said small picker disks and positioned within said arc, said large picker disk being mounted to permit movement a greater distance from said small picker disks, all of said picker disks having serrated peripheral edges forming upwardly directed teeth, and a dog in cooperative relationship with the teeth of the said large picker disk, whereby rotation of the large picker disk is permitted only in harmony with the forward movement of a hog passing between said opposed picker disks.

17. In a device of the class described, a shackle stop, and means operative by hogs being unshackled to operate said shackle stop.

18. In a device of the class described, a shackle stop comprising a plate positioned in the line of travel of shackled hogs, a rod rigidly affixed to said plate and pivotally mounted to a frame, said rod slidable in an eye in a rod pivotally mounted at a remote point from said eye and having a portion bent at said eye forming a bearing from which said last mentioned rod may pivot, and having an end adapted to normally block shackles on a rail contacted by said end, said last mentioned rod being so positioned that said end in contact with said rail may be lifted from contact therewith by reason of pressure applied to the edge of said plate whereby said plate and said rods in cooperation with said eye form a linkage system for the operation of said shackle block.

19. In a device of the class described including an inclined bleeding rail, a stop and feed mechanism in cooperative relation with said bleeding rail comprising a pair of sleeves, pins in said sleeves, links pivotally connected with said pins and pivotally connected with either arm of a pivoted link whereby pins may be alternately contacted with said rail and means to effect said alternating contact.

20. In a device of the class described, a picker disk mounted on a picker disk plate, said picker disk plate pivotally mounted on a fixed plate, a pin in said picker disk plate, a slot in said fixed plate, said pin positioned to ride in said slot, a spring urging said picker disk plate in one direction, said spring being yieldable whereby pressure applied to said picker disk will cause said pin to ride in said slot to the opposite end thereof, said picker disk being rotatably mounted and a spring urged dog in cooperative relationship with teeth on the peripheral edge of said picker disk.

21. In a device of the class described, including an inclined rail for the gravity conveyance of shackled carcasses, spaced guide rails defining the line of travel of the carcasses to restrict sidesway, means for releasing shackles from said shackled carcasses and means above said guide rails for directing said carcasses, between said releasing means.

22. In a device of the class described, including an inclined rail for the gravity conveyance of shackled carcasses, parallel guide rails defining the line of travel of the carcasses, positioned at the body portion of the carcasses to restrict sidesway thereof, guide rails above said first mentioned guide rails, said last mentioned guide rails converging inwardly to form a constricted passage, and means flanking said passage to unshackle carcasses passing therethrough.

23. In a device of the class described, including an inclined rail for the gravity conveyance of shackled carcasses, parallel guide rails defining the line of travel of the carcasses, positioned at the body portion of the carcasses to restrict sidesway thereof, converging guide rails above the parallel guide rails defining a progressively constricted passage converging in the direction of inclination of the inclined rail, and rotatable picker disks flanking the passage adapted to unshackle carcasses passing therethrough.

FRED T. BREWSTER.

CERTIFICATE OF CORRECTION.

Patent No. 2,052,749. September 1, 1936.

FREDERICK T. BREWSTER.

It is hereby certified that error appears in the printed specification of the above numbered patent requiring correction as follows: Page 1, first column, line 52, for "hamstring" read gam string; page 3, first column, line 49, for the reference numeral "78" read 87; line 50, for "shackled" read shackle and that the said Letters Patent should be read with these corrections therein that the same may conform to the record of the case in the Patent Office.

Signed and sealed this 27th day of October, A. D. 1936.

Henry Van Arsdale
Acting Commissioner of Patents.

(Seal)